R. A. HEISING.
OSCILLATION GENERATOR.
APPLICATION FILED OCT. 12, 1915.
1,240,206.
Patented Sept. 18, 1917.
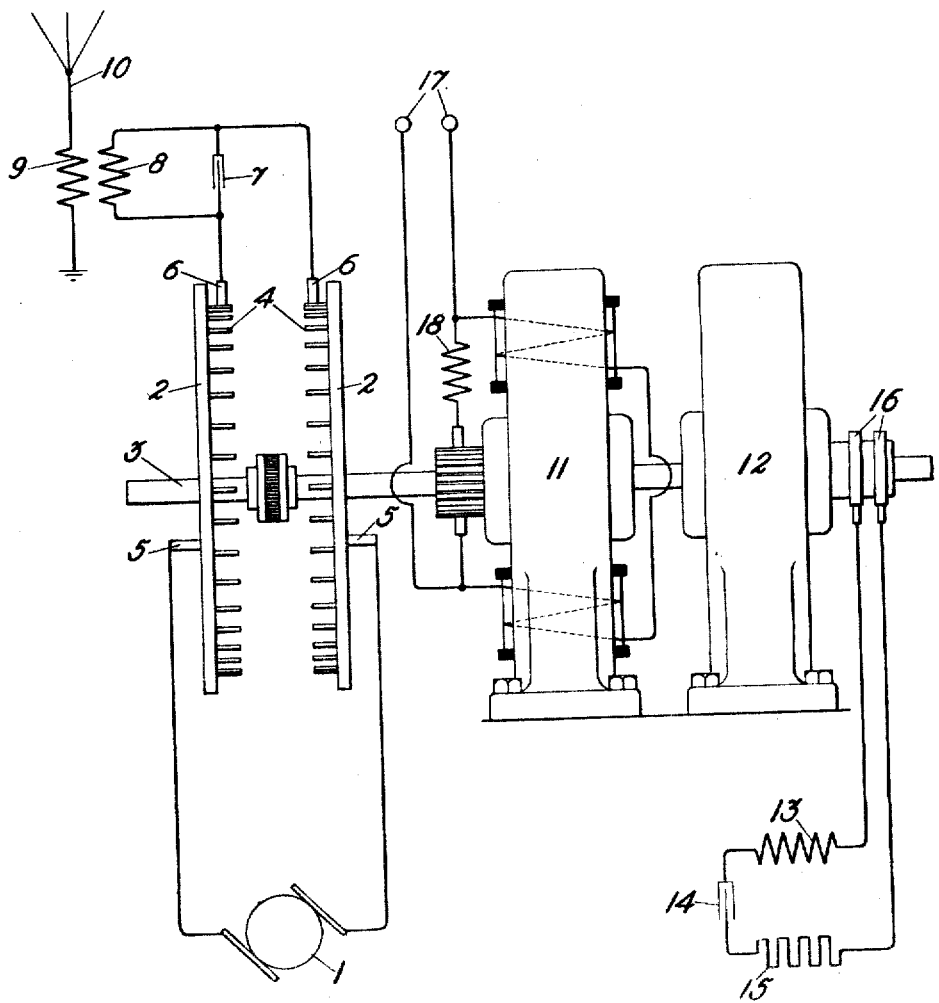
Inventor:
Raymond A. Heising.
by A. C. Saunel, Atty.

UNITED STATES PATENT OFFICE.

RAYMOND A. HEISING, OF EAST ORANGE, NEW JERSEY, ASSIGNOR, BY MESNE ASSIGNMENTS, TO WESTERN ELECTRIC COMPANY, INCORPORATED, A CORPORATION OF NEW YORK.

OSCILLATION-GENERATOR.

1,240,206.   Specification of Letters Patent.   Patented Sept. 18, 1917.

Application filed October 12, 1915. Serial No. 55,396.

*To all whom it may concern:*

Be it known that I, RAYMOND A. HEISING, a citizen of the United States, residing at East Orange, in the county of Essex and State of New Jersey, have invented certain new and useful Improvements in Oscillation-Generators, of which the following is a full, clear, concise, and exact description.

This invention relates to apparatus for the production of continuous or approximately continuous high frequency oscillations.

Its object is to produce in a circuit high frequency oscillations suitable for wireless telegraphy or the like, by means of apparatus whose operation is not primarily dependent upon the production of a spark to secure sudden increases in voltage. To this end this invention makes use of a mechanical contact-making means, whereby power is supplied to an oscillating circuit by means of a high-voltage direct-current generator at those times during the cycle at which the difference of the voltage between the generator terminals and that across the oscillation circuit is small. The current required to energize the resonant circuit is here supplied conductively by metallic connection to the generator instead of being supplied through a spark gap. In this specification the term metallic connection is used to include those conductors in which metallic conduction takes place, as the ordinary metals, carbon, etc., as distinguished from a connection which transfers electricity by means of a spark or by convection.

This invention will be more fully explained in connection with the drawing which represents a rotating means for periodically connecting the oscillation circuit to the generator, combined with a device adapted to secure constant speed of rotation.

Referring to the drawing, 1 represents a high-voltage direct-current generator, 2 represents two rotatable disks rigidly mounted upon the shaft 3 and insulated from each other. These disks have projecting studs or contacts 4, equally spaced around their circumferences and an equal number on each disk. By means of the brushes 5, the conducting disks 2 are maintained in connection with the terminals of the generator 1 so that the difference of potential between these disks is equal to the electromotive force of the generator. The brushes 6 are arranged to make contact with the studs 4 in such a way that each one of a pair of brushes bears upon a stud at the same instant. The brushes 6 are connected to the two terminals of the oscillation circuit comprising condenser 7 and inductance coil 8, this circuit being tuned to the frequency which it is desired to generate. Another coil 9 is loosely coupled to the coil 8 and serves to transfer power from the above mentioned resonant circuit to a load in which it is to be consumed, for example, to the antenna 10. The shaft 3 is driven by means of a motor 11.

The operation of the system is as follows: At the instant at which the brushes 6 make contact with a pair of studs 4, a rush of current takes place which charges condenser 7 to a voltage equal to that of the generator. Contact is immediately broken with the disks and the condenser discharges through the inductance coil 8. Oscillations are therefore set up in the circuit 7—8, which, if the damping of the circuit, due to the drainage of power from it, and to the resistance in it, is small, are persistent, that is, are very little attenuated as time goes on. After the lapse of a time equal to one cycle, the condenser 7 will again be charged to approximately its original potential difference, this value, however, being slightly less than the original because of the damping of the oscillations. If, at this time, the brushes 6 again make contact with a pair of studs, a sudden rush of current will take place from the generator and renew the charge on the condenser to its original value. Since, however, the loss of charge in the condenser during one cycle is relatively small, the potential difference between the brushes and the disks at the end of the first cycle will also be relatively small, and therefore the transfer of power may take place without the necessity for heavy sparking at the studs when contact is broken. This is in contrast to the ordinary method of operation of such resonant circuits in which a disruptive discharge over a spark gap is relied upon to secure the high voltage necessary to charge the resonant circuit. Since in this device it is essential for proper operation that immediately upon contact of the brush with a stud, a charge shall flow to the condenser, no inductances must be inserted in the generator leads, as is usual in the operation of previous devices depending upon a spark. Since contact is made only at the peak of the voltage wave, the generator will not act as a short-circuit to the resonant circuit, and these inductances may be dispensed with. In order that the operation shall be satisfactory, it is essential that the speed of the motor be such as to insure contact of a brush with a stud once every cycle, or at least once every two or three cycles, so that the decrease in amplitude of the voltage wave, due to damping, shall not be sufficient to produce a spark. Due, however, to the fact that there is then practically no tendency to spark in this device, the studs 4 may be spaced at distances small compared with those distances usual in the devices of the class mentioned in which disruptive discharge takes place. For this reason, although it is required that a large number of studs shall pass each brush per second, still it is not necessary that excessive speeds of rotation shall be employed. The problem of securing sufficiently high mechanical speeds in those devices in which disruptive discharge is relied upon has, as is well known, been a difficult one to solve.

The remainder of the drawing represents a means which may be used with this device for insuring approximate constancy of speed. Here, 12 is an alternating current generator rigidly connected to the shaft 3 or adapted to be positively driven by it. This generator supplies a tuned circuit comprising resistance 15, condenser 14 and inductance 13, connection being made to it by means of the slip rings 16. This resonant circuit may obviously be included in the armature of the alternator itself, but is here shown outside for the sake of clearness. It will be obvious that when the alternator is driven at a speed corresponding to the resonant frequency of the tuned circuit, the power dissipated in the resistance of that tuned circuit will be a maximum, since the current in it will be a maximum. This fact is made use of in securing speed regulation in the manner to be described later. The motor 11 is supplied from a source of constant voltage 17, and has included in its armature circuit a resistance 18. Recalling that the effect of such a resistance upon the operation of the direct current motor is to lower the effective voltage over the terminals of the latter as the load increases, the method of maintaining constant speed will now be apparent. Suppose that the resonant circuit 13, 14, 15 is tuned to a frequency slightly higher than that which would be developed were the alternator running at the speed required for operating the contact-making device. Then, if for any reason the speed of the alternator increases, a larger current will be set up in the tuned circuit, which will consequently increase the load upon the alternator 12, and therefore also on the motor 11. But the effect of this increase in load is, as stated before, to lower the effective voltage over its terminals, and the speed of the shaft will therefore tend to fall again to its original value. On the other hand, if the speed of the motor is decreased, the frequency developed by the alternator will depart still more from that required for resonance, the load on the generator and motor will decrease, the voltage over its terminals will increase, and consequently the speed will tend to rise again to the correct value.

What is claimed is:

1. In an oscillation generator, the combination of a source of electromotive force, a complete oscillation circuit, means for periodically connecting said circuit to said source and for periodically isolating said circuit from said source.

2. An oscillation generator comprising an oscillation circuit having a constant natural frequency, a source of electromotive force, means for supplying said circuit from said source at times differing by integral multiples of a natural period of said circuit, and translating means associated with said circuit.

3. An oscillation generator comprising an oscillation circuit having a constant natural frequency, a source of electromotive force, contact-making means for establishing a metallic connection between the terminals of the resonant circuit and the terminals of the source of electromotive force at times differing by integral multiples of a natural period of said oscillation circuit, and translating means associated with said circuit.

4. An oscillation generator comprising an oscillation circuit having a constant natural frequency, a source of electromotive force, contact-making means for establishing a metallic connection between the terminals of said circuit and of said source at those times at which the potential difference between the terminals of the oscillation circuit and those of the source of electromotive force is relatively small, and translating means associated with said circuit.

5. An oscillation generator comprising a resonant circuit having a constant natural frequency, a source of electromotive force and a rotating contact-making means whereby current is supplied by metallic conduction from said source to said circuit at those times at which the voltage over said contacts is relatively small.

6. An oscillation generator comprising a resonant circuit, a source of electromotive force, a rotatable member carrying two sets of equally spaced contact studs, one of each of said sets being connected respectively to a terminal of said source, two brushes connected with said resonant circuit, said brushes being adapted to make metallic connection respectively with a stud of each set, and means for rotating said member.

In witness whereof, I hereunto subscribe my name this 7th day of October A. D. 1915.

RAYMOND A. HEISING